United States Patent
Sexton et al.

(10) Patent No.: US 9,818,448 B1
(45) Date of Patent: Nov. 14, 2017

(54) MEDIA EDITING WITH LINKED TIME-BASED METADATA

(71) Applicant: Avid Technology, Inc., Burlington, MA (US)

(72) Inventors: Connor E. Sexton, Ashland, OR (US); Steven H. Milne, Palo Alto, CA (US)

(73) Assignee: Avid Technology, Inc., Burlington, MA (US)

( * ) Notice: Subject to any disclaimer, the term of this patent is extended or adjusted under 35 U.S.C. 154(b) by 0 days.

(21) Appl. No.: 15/483,986

(22) Filed: Apr. 10, 2017

(51) Int. Cl.
| | |
|---|---|
| G06F 17/00 | (2006.01) |
| G11B 27/031 | (2006.01) |
| G11B 27/34 | (2006.01) |
| H04N 5/92 | (2006.01) |
| H04S 7/00 | (2006.01) |

(52) U.S. Cl.
CPC ............ G11B 27/031 (2013.01); G11B 27/34 (2013.01); H04N 5/9202 (2013.01); H04S 7/305 (2013.01); *H04S 2400/11* (2013.01); *H04S 2400/15* (2013.01)

(58) Field of Classification Search
CPC ..... G11B 27/031; G11B 27/34; G11B 27/036; H04N 5/9202; H04S 7/305; H04S 2400/15; H04S 2400/11; H04S 2400/13; H04S 2420/03; H04R 2227/005; H04R 2420/01; H04R 2430/00; H04R 2430/01; H04R 2430/03
See application file for complete search history.

(56) References Cited

U.S. PATENT DOCUMENTS

| | | | | |
|---|---|---|---|---|
| 6,218,971 | B1 * | 4/2001 | Sugihara | H04H 60/04 341/110 |
| 7,006,642 | B1 * | 2/2006 | Kumai | H04H 60/04 369/4 |
| 2003/0055518 | A1 * | 3/2003 | Aiso | H04H 60/04 700/94 |
| 2004/0133291 | A1 * | 7/2004 | Nakayama | G06F 8/67 700/94 |
| 2012/0059492 | A1 * | 3/2012 | Radford | H04H 60/04 700/94 |
| 2015/0063602 | A1 * | 3/2015 | Radford | H04H 60/04 381/119 |
| 2017/0194033 | A1 * | 7/2017 | Patierno | G11B 27/031 |

* cited by examiner

*Primary Examiner* — Andrew C Flanders
(74) *Attorney, Agent, or Firm* — Oliver Strimpel

(57) ABSTRACT

Systems and methods for linking time-based media and temporal metadata provide single command control during editing of media having associated temporal metadata. A single control enables an editor to switch between monitoring both source media and its corresponding temporal metadata and monitoring both a pre-recorded version of the media and its corresponding temporal metadata. Another single control enables an editor to start and stop the recording of a source media track and its corresponding source temporal metadata. In one application, the editing is performed for media tracks having time-based spatial metadata for playback in immersive environments with the spatial metadata defining an apparent location of sound objects within the immersive environment.

8 Claims, 4 Drawing Sheets

MEDIA EDITING WITH LINKED TIME-BASED METADATA

BACKGROUND

In systems for editing and producing video and audio, it is increasingly necessary to include in the editing process various kinds of data that are adjunct to the audio and video data. Some of these data are associated with a video or audio sequence as a whole, or associated with a segment, and are not synchronous. Examples include descriptive metadata, such as information about the people involved in the production, date and location, as well as structural metadata, such as image format/type (e.g., HD, SD) and bit rate. However an increasing range of information in the form of data streams that are time-synchronized with the audio and video content is also being generated. This information is distinct from the audio and video portions itself, and represents additional information pertaining to the production and/or subject matter of the material.

In existing media editing and production systems, time-based adjunct data, or metadata, are handled using different interfaces and editing paradigms from those for editing the audio or video media. This lack of integration introduces cumbersome and error-prone workflows for editors since it is often difficult to ensure that a particular version of the media is being monitored or recorded with the correct version of its time-based metadata. There exists a need to coordinate and streamline media editing interfaces to enable media to be edited more efficiently and reliably together with its corresponding time-based metadata.

SUMMARY

In general, systems and methods for linking time-based media and time-based metadata are described that provide single command control during editing of media having associated temporal metadata.

In general, in a first aspect, a media editing method comprises: on a first media editing system: storing a track of time-based media; storing time-based metadata that pertains to and is temporally synchronized with the track of time-based media; while playing back the stored time-based media track and the stored time-based metadata on the first media editing system: receiving media and time-based metadata from a second media editing system, wherein the received media and metadata includes at least one of an edited version of the time-based media track and an edited version of the time-based metadata; enabling a user of the first media editing system to: actuate a first single control of the first media editing system to toggle between: (i) monitoring playback of the stored time-based media track and the stored time-based metadata; and (ii) monitoring playback of the media and time-based metadata received from the second media editing system; and actuate a second single control of the first media editing system to start and stop recording the media and time-based metadata received from the second media editing system, wherein recording the media and time-based metadata received from the second media editing system overwrites a temporally corresponding portion of the media track and the time-based metadata stored on the first system.

Various embodiments include one or more of the following features. The time-based media tracks of the first and second media editing systems are audio tracks; and the time-based metadata of the first media editing systems comprise panning automation data that define an apparent location of a source of audio data on the audio track stored on the first media editing system in a space within a venue for playing back the audio track stored on the first media editing system; and the time-based metadata of the second media editing systems comprise panning automation data that define an apparent spatial location of a source of audio data on the audio track received from the second media editing system within a venue for playing back the audio track received from the second media editing system. The time-based media tracks are audio tracks and the time-based metadata comprise reverberation settings for audio data on the audio tracks in a venue for playing back the audio tracks.

In general, in another aspect, a media editing system comprises: a first digital audio workstation comprising a first automation system and first audio storage, the first digital audio station in data communication with a second digital audio workstation, the second digital audio workstation comprising a second automation system and second audio storage, wherein the first digital audio workstation is configured to: receive from the second digital audio workstation an audio track and time-based metadata pertaining to the audio track; enabling a user of the first digital audio workstation to: actuate a first single control of the first digital audio workstation to select whether the first digital audio workstation (i) monitors playback of the audio track and the time-based metadata received from the second digital audio workstation; or (ii) monitors playback of a corresponding audio track and time-based metadata pertaining to the audio track stored on the first digital audio workstation; and actuate a second single control of the first digital audio workstation to cause the first digital audio workstation to start recording both the audio track and the time-based metadata pertaining to the audio track received from the second digital audio workstation, wherein recording the received audio and time-based metadata overwrites a temporally corresponding portion of the audio track and time-based metadata stored on the first digital audio workstation.

Various embodiments include one or more of the following features. The time-based metadata stored on the first digital audio workstation and the time-based metadata received from the second digital audio workstation are panning metadata that define an apparent spatial location of a source of audio data of their corresponding audio tracks in a venue for playing back the audio tracks. The first digital audio workstation outputs audio data and time-based metadata that is being monitored by the first digital audio workstation to a rendering system, wherein the rendering system generates signals for a plurality of speakers to generate audio that appears to originate from a source location determined by the time-based metadata being monitored by the first digital audio workstation.

In general, in a further aspect, a computer program product comprises: a non-transitory computer-readable medium with computer program instructions encoded thereon, wherein the computer program instructions, when processed by a first media editing system instruct the first media editing system to perform a method for media editing comprising: on the first media editing system: storing a track of time-based media; storing time-based metadata that pertains to and is temporally synchronized with the track of time-based media; while playing back the stored time-based media track and the stored time-based metadata on the first media editing system: receiving media and metadata from a second media editing system, wherein the received media and metadata includes at least one of an edited version of the time-based media track and an edited version of the time-based metadata; enabling a user of the first media editing system to: actuate a first single control of the first media editing system to toggle between: (i) monitoring playback of the stored time-based media track and the stored time-based metadata; and (ii) monitoring playback of the media and metadata received from the second media editing system; and actuate a second single control of the first media editing system to start and stop recording the media and metadata received from the second media editing system, wherein recording the media and metadata received from the second media editing system overwrites a temporally corresponding portion of the media track and the time-based metadata stored on the first system.

Various embodiments include one or more of the following features. The first media editing system and the second media editing system are digital audio workstations; the tracks of time-based media are audio tracks; and the time-based metadata of the first and second media editing systems comprise panning automation data that define an apparent spatial location of a source of audio data on their corresponding audio tracks within a venue for playing back the audio tracks.

DETAILED DESCRIPTION

Figure 1:
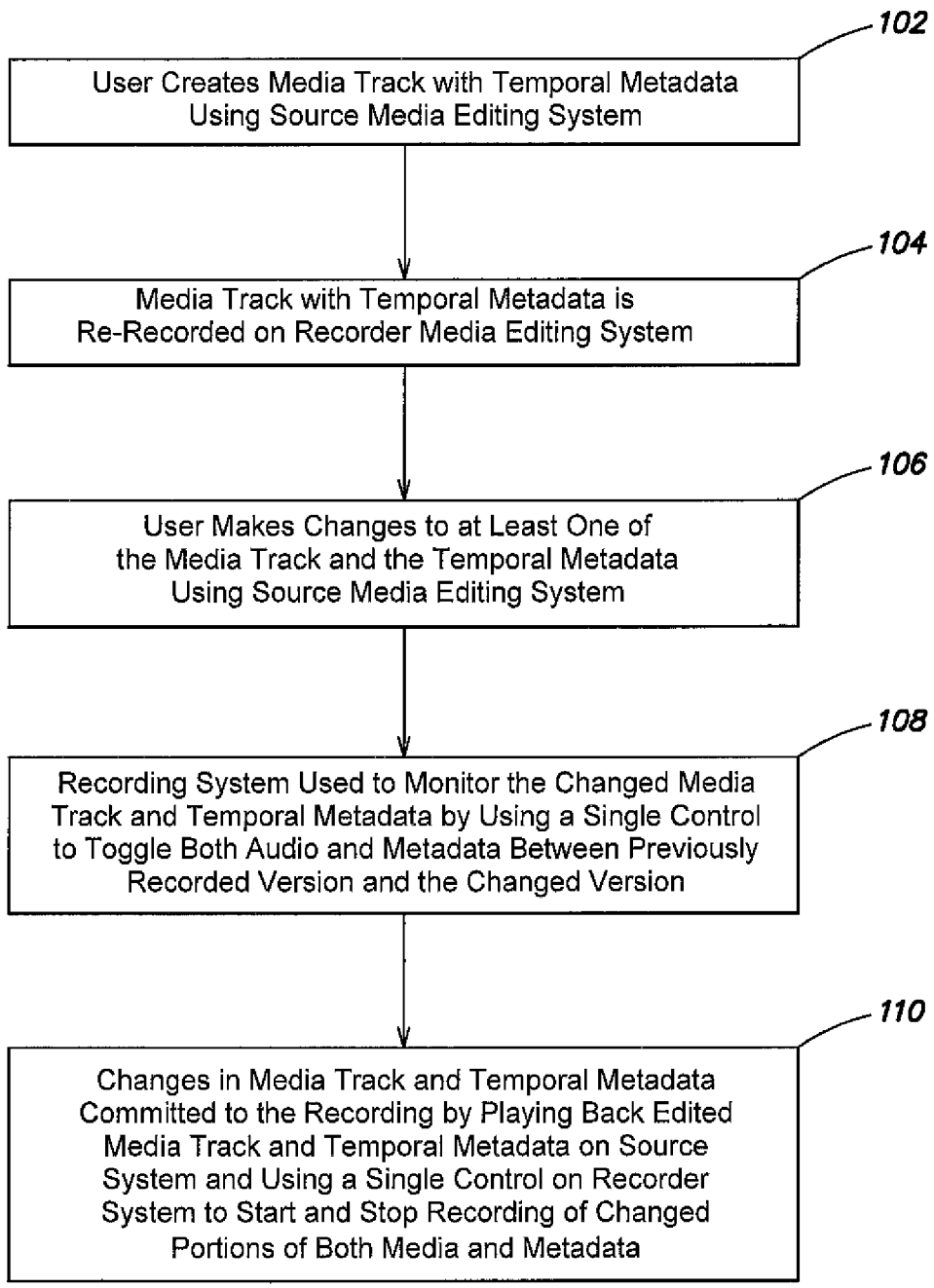
FIG. 1 is a high level flow diagram showing the steps involved in single control monitoring and recording of a media track and its associated temporal metadata.

Time-based metadata pertaining to video and audio programs include descriptive, structural, and enhancement data. For video, types of time-based metadata include, but are not limited to: closed and open captions; subtitles; film metadata, such as edgecodes, keycodes, and pull-down flags; timecodes; camera data, such as position, zoom, iris, and gain; location data, such as GPS coordinates; program description; 3D stereo parameters; aspect ratio conformance, such as Advanced Format Descriptor; and interactive television programming. Audio-specific examples include: mixing parameters, MIDI data, audio timecodes, and parameters that define spatial location for an object that is the source of the audio. In general, time-based metadata refers to metadata that can vary with the temporal location of its corresponding media. The metadata may be organized into clips, tracks, streams, and packets, with individual packets of time-based metadata occupying a unique time address which corresponds to a time interval of a media element, such as a video frame or an audio sample. Although there can be no more than one packet at a given time address (i.e., frame address or sample address), not every address within a range of media elements need have a metadata packet assigned to it, as in a sparse stream. As used herein, time-based metadata, and temporal metadata are used interchangeably.

In current media editing systems, the playback, recording, and editing of time-based metadata requires an editor to perform actions that are specific to the metadata and uncoupled to its associated media data. In a typical setting, two systems are involved in the editing process—a source system that is to supply the newly edited media and/or time-based metadata, and a recorder system that stores the current (pre-editing) version of the media and time-based metadata and records the newly edited material by overwriting or appending to the current version. Prior to performing an editing operation, i.e., committing an edited version of media and/or time-based metadata by overwriting or extending the existing version stored on the record system, the editor needs to monitor the state of the media and the metadata on both the source system and the recorder system. It is often desirable to switch back and forth frequently between playback of the existing version and the edited version, both in the run-up to the portion to be edited, as well as during the portion to be edited. This helps the editor detect any undesirable inconsistencies or discontinuities between the two versions that could be introduced by an edit, and mitigate them before making a commit. To do this, the editor must ensure that when he intends to monitor the new version, that both the media monitoring state and the metadata monitoring state are set to play back the source media and metadata respectively. Conversely, when he wishes to monitor the existing version, he must ensure that both the media monitoring state and the metadata monitoring state are set to play back the media and metadata stored on the recorder system. In existing systems, the commands that set the monitoring states for media are quite different from those that set the monitoring state for metadata, requiring the editor to perform a cumbersome series of steps when changing the monitoring state of both media and metadata at the same time. Furthermore, since each of the media and metadata monitoring state is separately controlled, the editor must keep track of the state of each at all times.

This situation can give rise to a number of problems. When wishing to monitor the source media and metadata, the editor may inadvertently fail to switch the monitoring states of both the media and the metadata, with the result that he may be monitoring the source media but metadata from the recorder, or be monitoring the recorder media with metadata from the source. In either situation, the editor risks receiving an obsolete and possibly inconsistent rendering of the playback.

A similar situation pertains when the editor wishes to commit (i.e., record) media and/or metadata using material received from the source system. In a typical editing operation, only a portion of a media composition may need to be updated, while the remainder is not altered. Thus, when the portion to be changed is reached, the editor needs to start recording both media and metadata from the source system at the same time. However, in many current systems, a recording system is always set to record metadata, unless either the metadata-recording subsystem is disabled, or the metadata input of the recorder system is set not to receive source metadata. Either of these actions prevents the editor from switching on the recording of the metadata without taking a cumbersome series of steps to switch to the metadata subsystem interface, and re-enable metadata recording, or set the recording system to receive metadata from the source. These steps are error-prone and can introduce undesirable delays before the recording system is ready to record. If the default state of the recording system in which the recorder is always recording metadata is inadvertently left on, the previously stored metadata may be mistakenly over-written with unexpected or null metadata. Another possible error could result in the failure to re-enable the metadata recording input after previously disabling it, with the result that the metadata for a media track may completely fail to be recorded during any stage. Conversely, if metadata recording is enabled but the media source is not switched to the source, metadata may be captured without source media.

The challenges discussed above are compounded by the inclusion within a single production of many media tracks, of which a significant number may be involved in the editing process at a given time. Each track may have existing and newly edited versions of media and its temporal metadata.

In the methods and systems described herein, the editor is provided with a single, unified control to switch the monitoring from both the source media and source time-based metadata to the corresponding versions of both the media and synchronized metadata previously stored on the recorder system. A single control is also provided to switch on the recording of both the source media and source temporal metadata to overwrite/extend the version stored on the recorder system, and subsequently to switch off the recording of both the source media and source metadata. The single-command monitoring and recording workflows are described in more detail below.

We now describe the use of single command monitoring and recording in the context of a common media production workflow, illustrated in the high level flow diagram shown in FIG. 1. The process starts with an editor using a source media editing system to create a media track together with its associated temporal metadata (step 102). The media may be recorded by a media capture device, or retrieved from another source, and the temporal metadata may be input by hand by the editor, or may be retrieved form another source. The media track and its temporal metadata is then received and recorded (i.e., stored) by a recorder system (step 104). Subsequently, a change is made to the media track and/or to the temporal metadata on the source media editing system (step 106). In one example, a new media clip replaces a corresponding clip in the first version, and the clip requires different temporal metadata. In this example, the original media and metadata is unchanged except for the portion corresponding to the new clip, for which both the media and the metadata is changed. In another example, no media changes are performed, but new temporal metadata is input. In a third example, no metadata changes are involved, but the media is edited.

An editor using the recording system now wishes to incorporate the changes performed on the source machine to the previously recorded version. The editor first monitors the media track and the temporal metadata of both the existing version and also of the newly edited version (step 108). Special attention is required in the run-up to the portion to be edited to make sure there are no undesirable discontinuities or artifacts that would be introduced by the edit. To establish this, the editor needs to play back the media track and the temporal metadata, switching back and forth between the new version and the existing version to determine whether the transition at the proposed insertion/record point corresponds to what is desired, and to ensure that outside the portion to be edited, there is no noticeable difference between the two versions. When the editor is satisfied with the proposed edits, the next step is to commit the edits to the previously recorded version (step 110). The editor starts synchronized playback on both the source and recorder media editing systems of the versions of the media track and temporal metadata stored on the respective systems, and uses a single control on the recorder system to start recording of both the media and temporal metadata from the source system onto the version stored on the recorder system, overwriting and/or extending the recorder system version accordingly. The same control is then used again to stop the recording of both media and metadata at the desired point, i.e., at the end of the portion to be edited. The use of a single command to switch between source and recorder versions of both media and metadata during monitoring, and of a single record command to start and stop recording of both media and metadata greatly improves the workflow as compared to existing systems, enabling more accurate and less error-prone edits.

We now describe the workflow in the context of the editing of audio data and its corresponding spatial metadata. Such workflows are becoming essential with the advent of immersive venues in which it is possible to control an apparent position of a sound object, i.e., a source of a particular sound, within three dimensional space. An example of such an immersive environment is one that uses the Dolby® Atmos™ system. During playback, a theater with such a system renders audio objects in real-time such that each sound appears to be emanating from its designated spot with respect to the loudspeakers present in the target theater. The rendering is specific to each theater, which might have anywhere from 16 to 64 speakers, each with a different layout. For such theaters, the spatial metadata that defines the location of the sound objects must be available in explicit form so that it can be used to render the media correctly for each theater. This contrasts with traditional multichannel technology, in which each of the audio tracks is mixed down (re-recorded) into a set of fixed channels to be used for all theaters.

In an audio editing environment, an important kind of temporal metadata consists of automation commands, which are recorded and played back by automation systems that form a part of audio editing systems. Such audio editing systems are commonly referred to as digital audio workstations (DAWs), an example of which is Pro Tools®, available from Avid Technology, Inc., Burlington, Mass. Automation systems are used in the audio editing environment for recording and then replaying commands that control audio parameters during playback. The spatial metadata used for controlling the apparent location of sound objects typically comprises automation data that controls panning parameters. Thus, in the context of audio editing, the temporal metadata involved comprise automation commands that are recorded, stored, and played back by automation systems. The interfaces and commands for controlling automation systems have hitherto been independent of and quite different from the audio (media) editing interfaces and commands, thus creating the need for unification discussed in general above. The differences stem in part from the fact that automation systems evolved on mixing consoles, which did not themselves record audio. In addition, automation modes required separate controls from audio controls because there are many more of them.

One significant operational difference between automation control and audio editing concerns the various automation modes that have no analogue with audio. While audio is either "recorded" or "played back," automation is "written" and "read," in one of several possible modes. Automation modes include Off in which automation is neither read nor written. This has no audio equivalent. Automation Read mode is equivalent to audio playback. Automation write modes are analogous to audio playback, but there are various write mode options: (i) Touch—in which automation is written once a control is touched and stops being written when the control is no longer touched (untouched); (ii) Latch—in which automation is written once a control is touched, and continues to be written even after it is untouched; (iii) Touch/Latch—in which the Touch mode applies for fader controls, and the Latch mode applies for all other controls; and (iv) Write Always—in which automation is written regardless of when a control is touched. Among the various write modes, the Write Always mode is the closest analogue to audio recording. In addition, automation includes Trim modes for each of the above modes, in which operation of a control applies a change in the value of the parameter being controlled, not an absolute value of the parameter. Trim modes have no audio analogue.

Figure 2:
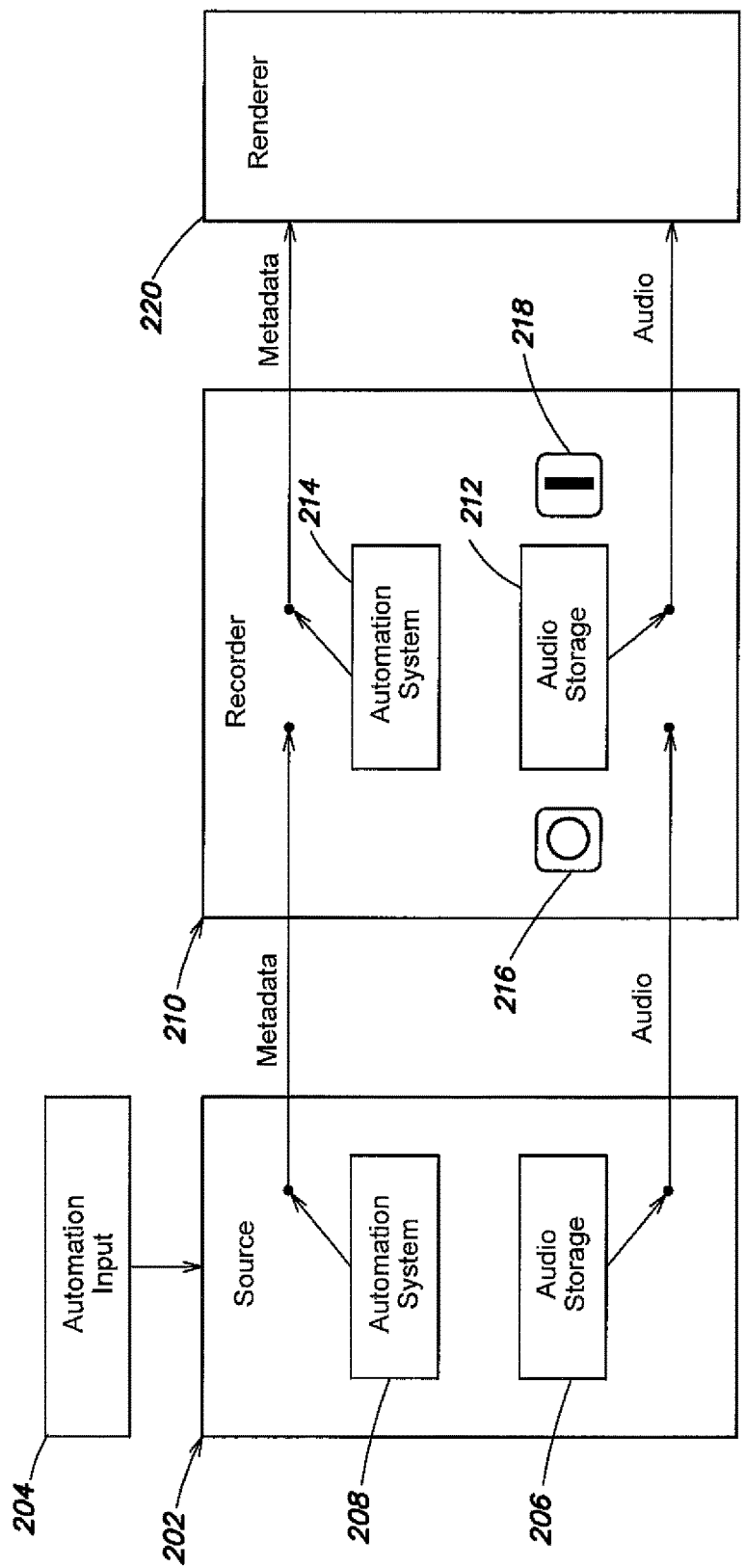
FIG. 2 is high level block diagram of a system for single control monitoring and recording of media and its associated temporal metadata showing monitoring of a previously recorded audio track and its associated temporal metadata.
Figure 3:
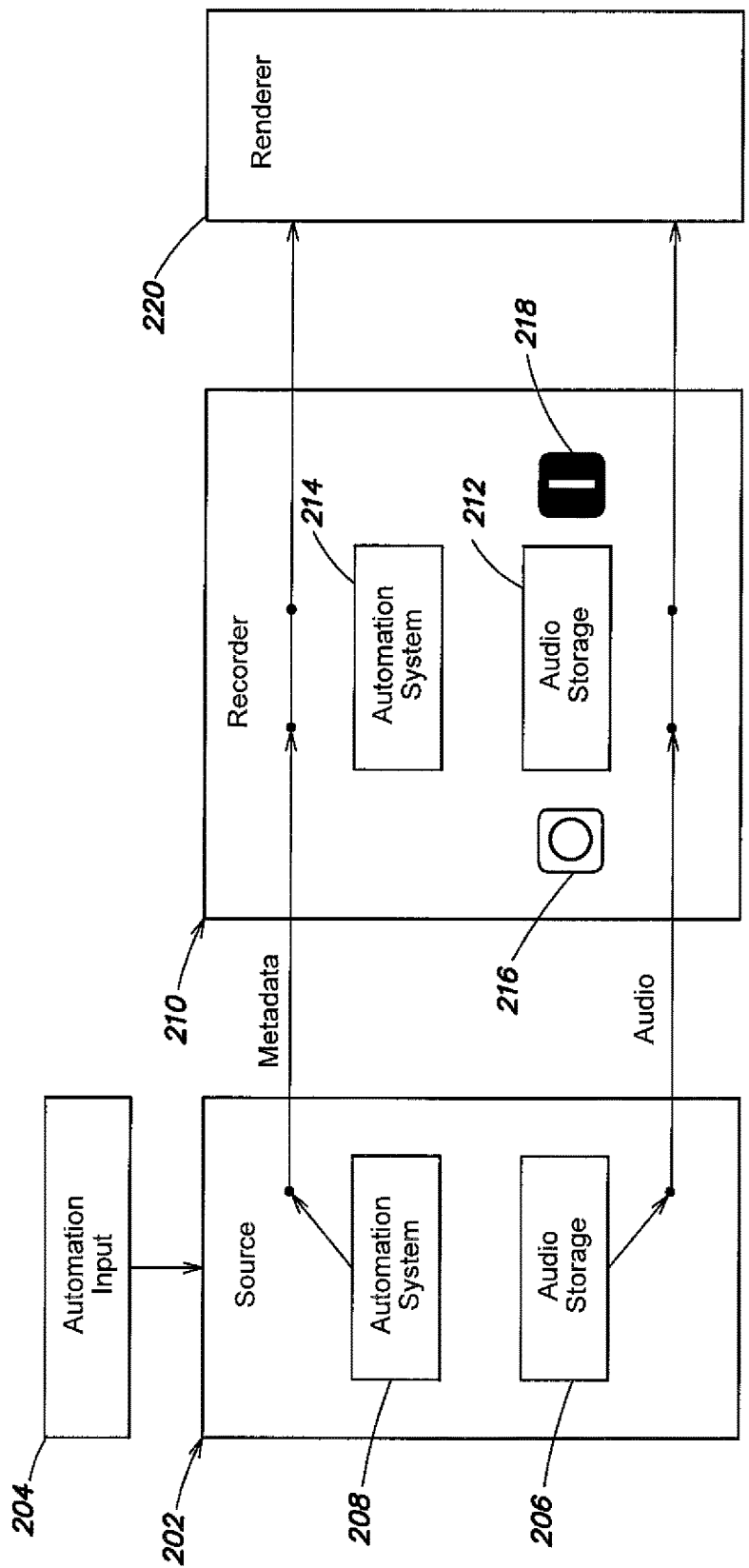
FIG. 3 is high level block diagram of a system for single control monitoring and recording of media and its associated temporal metadata showing monitoring of an edited source audio track and its associated temporal metadata.

FIGS. 2 and 3 illustrate the described workflows for single control monitoring of audio and the temporal metadata controlled by automation systems of DAWs. Source media editing system 202 is used to edit audio and its associated temporal metadata. Automation may be input manually via a specially adapted user interface 204. It includes audio storage 206, and automation system 208. Recorder DAW 210 is used to record the final version of the audio and metadata, and includes audio storage 212 and automation system 214. Recorder DAW 210 sends the audio and metadata to renderer system 220 at the playout venue that renders the audio with the metadata to produce the desired result. Recorder DAW 210 includes controls 216 and 218 that provide single action controls for both audio and metadata for recording and monitoring respectively.

FIG. 2 illustrates the monitoring of media and temporal metadata that will be recorded over, i.e., the version stored on recorder system 210, often referred to as PEC monitoring. In this mode, recording control 216 is not actuated, i.e., recording is not enabled. Control 218 is used to toggle to the monitoring mode illustrated in the figure, in which the playback output from audio storage 212 and automation system 214 are played out to renderer system 220. Thus, the rendered output corresponds to the media and metadata (i.e., automation commands) currently stored on recorder system 210. With a single key press/actuation of control 218, the user may switch into the second monitoring mode, often referred to as DIR monitoring, illustrated in FIG. 3, in which the version of the audio and the metadata (automation commands) stored on audio storage 206 and automation system 208 respectively of source DAW 202 are sent to renderer 220. In this mode, the source machine is set to playing back audio and reading the metadata (i.e., the automation). Thus, in this mode, the user monitors the source versions of audio and metadata, i.e., what is to be recorded (as opposed to what is to be recorded over). Rapid and easy switching back and forth between the source versions of both the audio and the metadata and the recorder versions of both the audio and the metadata are made possible by the ability to toggle a just a single control.

Figure 4:
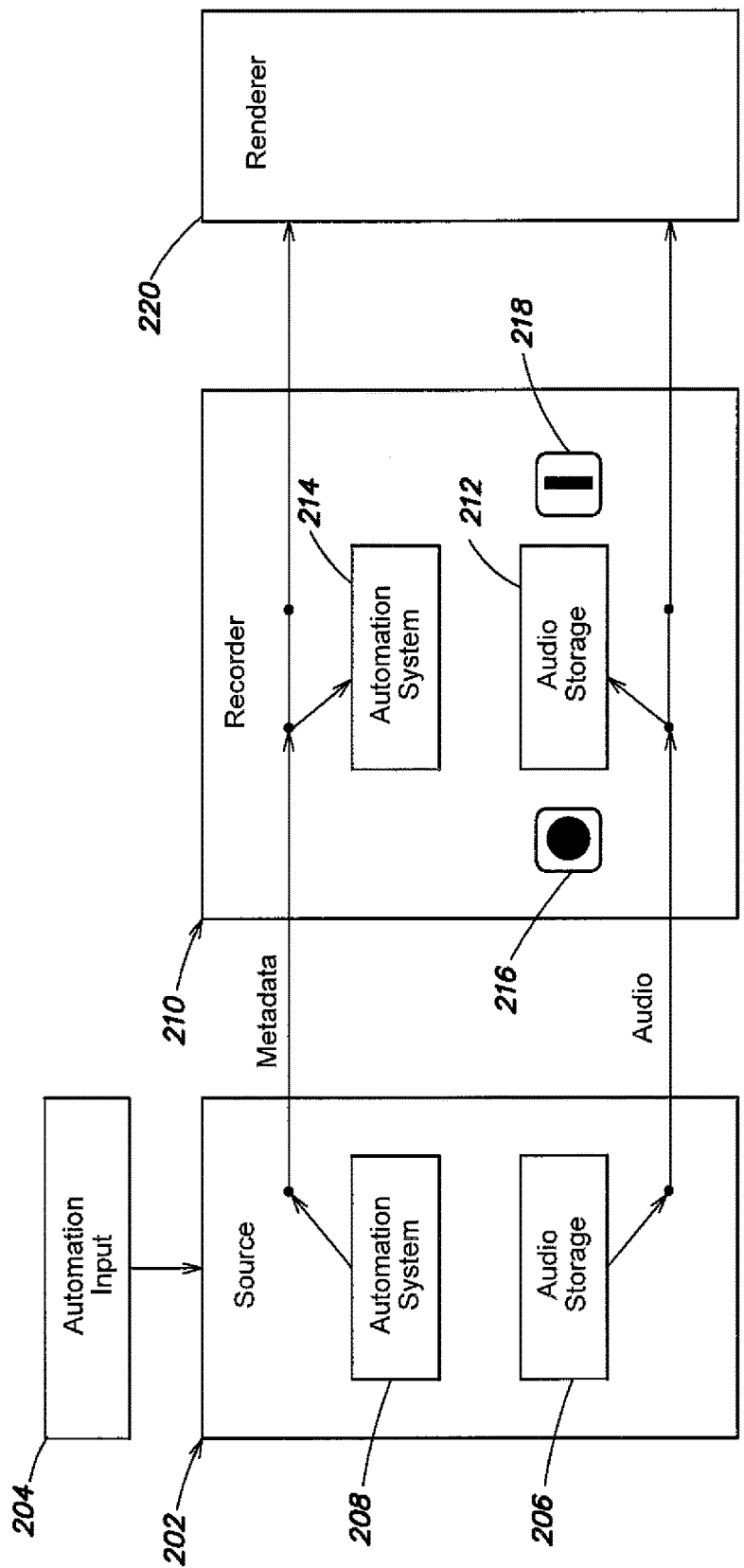
FIG. 4 is high level block diagram of a system for single control monitoring and recording of media and its associated temporal metadata showing recording of an edited source audio track and its associated metadata.

A similar single action capability is provided for starting and stopping the recording of audio and metadata in a unified manner, also known as punching in and punching out. This is illustrated in FIG. 4. DAWs 202 and 210 are playing back their respective audio tracks and automation commands in synchrony. To start (punch-in) recording, the editor actuates control 216 to start recording both the audio track and the automation commands from source system DAW's audio storage 206 and automation system 208. The figure illustrates recording system 210 in record mode. Actuating control 216 again stops recording of both the audio and the metadata, and recorder system 210 reverts to playback, and once again control 218 is used to control the monitoring mode.

Other applications of the single control of temporal metadata and media in monitoring and recording include the following. Temporal metadata representing reverberation settings for audio may be used to render audio for individual playout venues. Thus a rendering system in each venue interprets the reverberation metadata to achieve the desired effect in that venue. Similarly, temporal metadata may represent equalization settings for audio media, so that bass, midrange, and treble responses can be adapted between different venues or home listening environments. Volume level metadata for audio media enable users to create their own personalized mixes when listening at home. Three-dimensional graphical metadata describing shapes, textures, and positions may be used for both audio media and video media, enabling animation and live video to be combined with audio in a manner customized by a rendering system in each venue or playout environment.

The various components of the systems described herein may be implemented as computer programs using a general-purpose computer system. Each such a computer system typically includes a main unit connected to both an output device that displays information to a user and an input device that receives input from a user. The main unit generally includes a processor connected to a memory system via an interconnection mechanism. The input device and output device also are connected to the processor and memory system via the interconnection mechanism.

One or more output devices may be connected to the computer systems. Example output devices include, but are not limited to, liquid crystal displays (LCD), plasma displays, various stereoscopic displays including displays requiring viewer glasses and glasses-free displays, cathode ray tubes, video projection systems and other video output devices, printers, devices for communicating over a low or high bandwidth network, including network interface devices, cable modems, and storage devices such as disk or tape. One or more input devices may be connected to the computer systems. Example input devices include, but are not limited to, a keyboard, keypad, track ball, mouse, pen and tablet, touchscreen, camera, communication device, and data input devices. The invention is not limited to the particular input or output devices used in combination with the computer system or to those described herein.

The computer systems may be a general purpose computer systems, which are programmable using a computer programming language, a scripting language or even assembly language. The computer systems may also be specially programmed, special purpose hardware. In a general-purpose computer system, the processor is typically a commercially available processor. The general-purpose computer also typically has an operating system, which controls the execution of other computer programs and provides scheduling, debugging, input/output control, accounting, compilation, storage assignment, data management and memory management, and communication control and related services. The computer systems may be connected to a local network and/or to a wide area network, such as the Internet. The connected network may transfer to and from the computer system program instructions for execution on the computer, media data such as video data, still image data, or audio data, metadata, review and approval information for a media composition, media annotations, and other data.

A memory system typically includes a computer readable medium. The medium may be volatile or nonvolatile, writeable or nonwriteable, and/or rewriteable or not rewriteable. A memory system typically stores data in binary form. Such data may define an application program to be executed by the microprocessor, or information stored on the disk to be processed by the application program. The invention is not limited to a particular memory system. Time-based media may be stored on and input from magnetic, optical, or solid state drives, which may include an array of local or network attached disks.

A system such as described herein may be implemented in software, hardware, firmware, or a combination of the three. The various elements of the system, either individually or in combination may be implemented as one or more computer program products in which computer program instructions are stored on a computer readable medium for execution by a computer, or transferred to a computer system via a connected local area or wide area network. Various steps of a process may be performed by a computer executing such computer program instructions. The computer system may be a multiprocessor computer system or may include multiple computers connected over a computer network. The components described herein may be separate modules of a computer program, or may be separate computer programs, which may be operable on separate computers. The data produced by these components may be stored in a memory system or transmitted between computer systems by means of various communication media such as carrier signals.

Having now described an example embodiment, it should be apparent to those skilled in the art that the foregoing is merely illustrative and not limiting, having been presented by way of example only. Numerous modifications and other embodiments are within the scope of one of ordinary skill in the art and are contemplated as falling within the scope of the invention.

What is claimed is:

1. A media editing method comprising:
    on a first media editing system:
        storing a track of time-based media;
        storing time-based metadata that pertains to and is temporally synchronized with the track of time-based media;
    while playing back the stored time-based media track and the stored time-based metadata on the first media editing system:
        receiving media and time-based metadata from a second media editing system, wherein the received media and metadata includes at least one of an edited version of the time-based media track and an edited version of the time-based metadata;
        enabling a user of the first media editing system to:
            actuate a first single control of the first media editing system to toggle between:
                (i) monitoring playback of the stored time-based media track and the stored time-based metadata; and
                (ii) monitoring playback of the media and time-based metadata received from the second media editing system; and
            actuate a second single control of the first media editing system to start and stop recording the media and time-based metadata received from the second media editing system, wherein recording the media and time-based metadata received from the second media editing system overwrites a temporally corresponding portion of the media track and the time-based metadata stored on the first system.

2. The method of claim 1, wherein the time-based media tracks of the first and second media editing systems are audio tracks; and
    the time-based metadata of the first media editing systems comprise panning automation data that define an apparent location of a source of audio data on the audio track stored on the first media editing system in a space within a venue for playing back the audio track stored on the first media editing system; and
    the time-based metadata of the second media editing systems comprise panning automation data that define an apparent spatial location of a source of audio data on the audio track received from the second media editing system within a venue for playing back the audio track received from the second media editing system.

3. The method of claim 1, wherein the time-based media tracks are audio tracks and the time-based metadata comprise reverberation settings for audio data on the audio tracks in a venue for playing back the audio tracks.

4. A media editing system comprising:
    a first digital audio workstation comprising a first automation system and first audio storage, the first digital audio station in data communication with a second digital audio workstation, the second digital audio workstation comprising a second automation system and second audio storage, wherein the first digital audio workstation is configured to:
        receive from the second digital audio workstation an audio track and time-based metadata pertaining to the audio track;
        enabling a user of the first digital audio workstation to:
            actuate a first single control of the first digital audio workstation to select whether the first digital audio workstation (i) monitors playback of the audio track and the time-based metadata received from the second digital audio workstation; or (ii) monitors playback of a corresponding audio track and time-based metadata pertaining to the audio track stored on the first digital audio workstation; and
            actuate a second single control of the first digital audio workstation to cause the first digital audio workstation to start recording both the audio track and the time-based metadata pertaining to the audio track received from the second digital audio workstation, wherein recording the received audio and time-based metadata overwrites a temporally corresponding portion of the audio track and time-based metadata stored on the first digital audio workstation.

5. The media editing system of claim 4, wherein the time-based metadata stored on the first digital audio workstation and the time-based metadata received from the second digital audio workstation are panning metadata that define an apparent spatial location of a source of audio data of their corresponding audio tracks in a venue for playing back the audio tracks.

6. The media editing system of claim 4, wherein the first digital audio workstation outputs audio data and time-based metadata that is being monitored by the first digital audio workstation to a rendering system, wherein the rendering system generates signals for a plurality of speakers to generate audio that appears to originate from a source location determined by the time-based metadata being monitored by the first digital audio workstation.

7. A computer program product comprising:
    a non-transitory computer-readable medium with computer program instructions encoded thereon, wherein the computer program instructions, when processed by a first media editing system instruct the first media editing system to perform a method for media editing comprising:

on the first media editing system:
storing a track of time-based media;
storing time-based metadata that pertains to and is temporally synchronized with the track of time-based media;
while playing back the stored time-based media track and the stored time-based metadata on the first media editing system:
receiving media and metadata from a second media editing system, wherein the received media and metadata includes at least one of an edited version of the time-based media track and an edited version of the time-based metadata;
enabling a user of the first media editing system to:
actuate a first single control of the first media editing system to toggle between:
(i) monitoring playback of the stored time-based media track and the stored time-based metadata; and
(ii) monitoring playback of the media and metadata received from the second media editing system; and
actuate a second single control of the first media editing system to start and stop recording the media and metadata received from the second media editing system, wherein recording the media and metadata received from the second media editing system overwrites a temporally corresponding portion of the media track and the time-based metadata stored on the first system.

8. The computer program product of claim 7, wherein:
the first media editing system and the second media editing system are digital audio workstations;
the tracks of time-based media are audio tracks; and
the time-based metadata of the first and second media editing systems comprise panning automation data that define an apparent spatial location of a source of audio data on their corresponding audio tracks within a venue for playing back the audio tracks.

* * * * *